United States Patent [19]
Charnesky

[11] Patent Number: 6,000,365
[45] Date of Patent: Dec. 14, 1999

[54] PAW PAD

[76] Inventor: Bobby Charnesky, 614 Semple Ave., Pittsburgh, Pa. 15202

[21] Appl. No.: 09/079,126

[22] Filed: May 14, 1998

[51] Int. Cl.[6] .................................................. A01K 29/00
[52] U.S. Cl. ....................... 119/712; 119/706; 160/105; 160/368.1
[58] Field of Search .................... 119/712, 706, 119/28.5, 702; 49/55, 50, 61; 160/105, 368.1

[56] References Cited

U.S. PATENT DOCUMENTS

| | | | |
|---|---|---|---|
| 2,803,471 | 8/1957 | Roth | 160/105 X |
| 3,032,351 | 5/1962 | Lewis, Jr. | 280/150 |
| 3,204,981 | 9/1965 | Edwards | 160/105 X |
| 4,653,562 | 3/1987 | Moss et al. | 160/105 |
| 4,854,364 | 8/1989 | Junker | 160/105 |
| 4,913,212 | 4/1990 | Clavier | 160/105 |
| 5,311,701 | 5/1994 | Psaros | 160/105 X |
| 5,570,542 | 11/1996 | Cameron | 49/55 X |
| 5,713,624 | 2/1998 | Tower | 119/712 X |
| 5,768,827 | 6/1998 | Hackett | 49/50 X |
| 5,809,933 | 9/1998 | Conwell, III | 119/28.5 |

*Primary Examiner*—Robert P. Swiatek
*Assistant Examiner*—Yvonne R. Abbott
*Attorney, Agent, or Firm*—Susan E. Nagel, Esq.

[57] ABSTRACT

A removable structure which is placed on and in a car door on which to allow pets to place their paws in order to allow them to place their head outside an open car door window and which provides a support base which serves to support and restrain them during vehicle motion.

2 Claims, 2 Drawing Sheets

PAW PAD

BACKGROUND

1) Field of the Invention

The invention relates to portable, removable pet car devices which may be placed on a car door to allow pets access to the outside while riding in a car.

2) Description of the Related Art

Structures that have been developed to facilitate taking a pet in a car include devices aimed at restraining pets for safety purposes and making pets more comfortable. Devices exist that allow pets to receive outside air while riding in a car, such as the safety shield window insert in U.S. Pat. No. 5,570,542, automotive window safety guard in U.S. Pat. No. 4,653,562, and pet barrier for car window installation in U.S. Pat. No. 4,854,364. Applicant's invention is novel over this prior art, however as Applicant's invention has a structure which allows a pet to place his head outside a car to receive fresh air while driving, as well as to provide a support base which serves to support and restrain the pet during vehicle motion.

SUMMARY OF INVENTION

Applicant's invention is a portable, removable structure which is placed on and in a car door on which to allow pets to place their paws in order to allow them to place their head outside an open car door window and which provides a support base which serves to support and restrain them during vehicle motion.

DESCRIPTION OF PREFERRED EMBODIMENT

Figure 1:
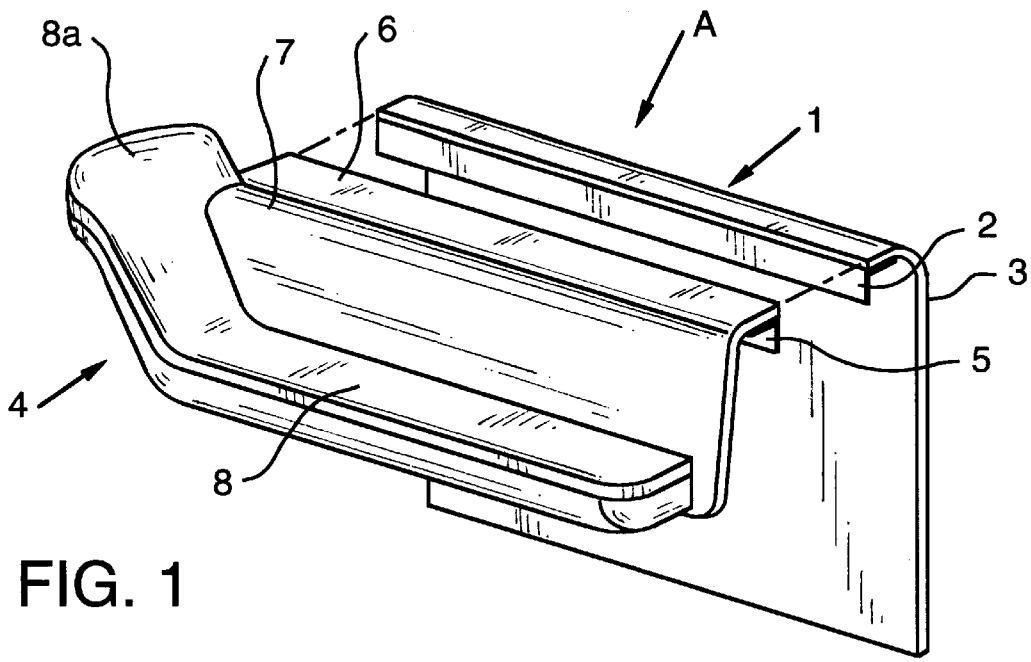
FIG. 1 is a perspective view of the invention.

Applicant's pet car pad (A) is in two parts, as may be viewed in FIG. 1. The first part is a car door protective device (1) including an outer window insert (2) attached to a bendable car door protective shield (3). The second part is a support base (4) for an open window including an inner window insert (5) attached to a window support base (6) and a inner car door support arm (7). The inner car door support arm (7) is attached at its lowermost position to a flexible paw support step (8), which has at its forward-most position an upwardly sloping arm (8A).

The inner window insert (5) and outer window insert (2) are inserted opposite to either side of an open vehicle window. The pet may then place its hind legs on the vehicle's seat and extend its front paws to rest on the paw support step (8). It may then extend its head outside of the vehicle's window. The upwardly sloping arm (8A) of paw support step (8) serves to support and restrain the pet during vehicle motion. The car door protective shield (3) protects the vehicle's door when the pet extends its paws further and rests them outside of the vehicle's window.

Figure 2:
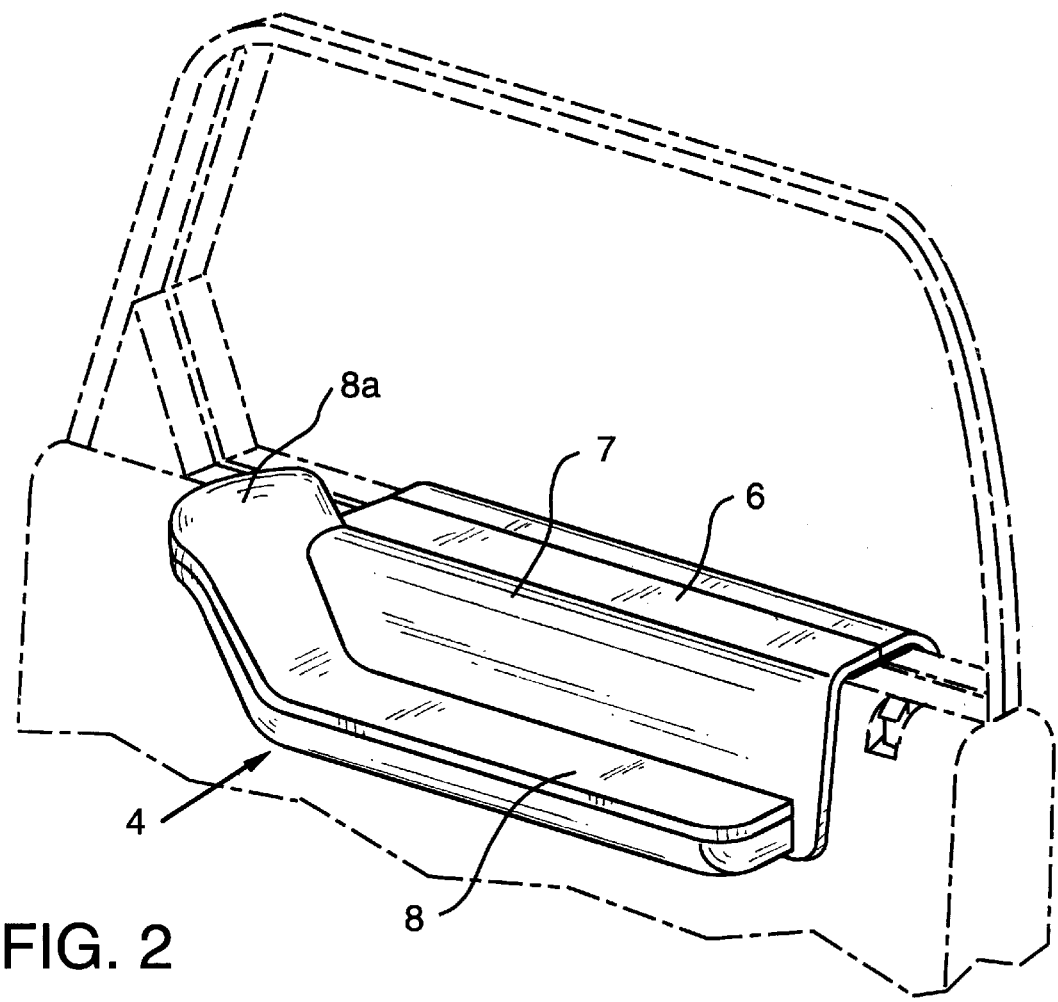
FIG. 2 is a perspective view of the invention in use from the inside of a car.
Figure 3:
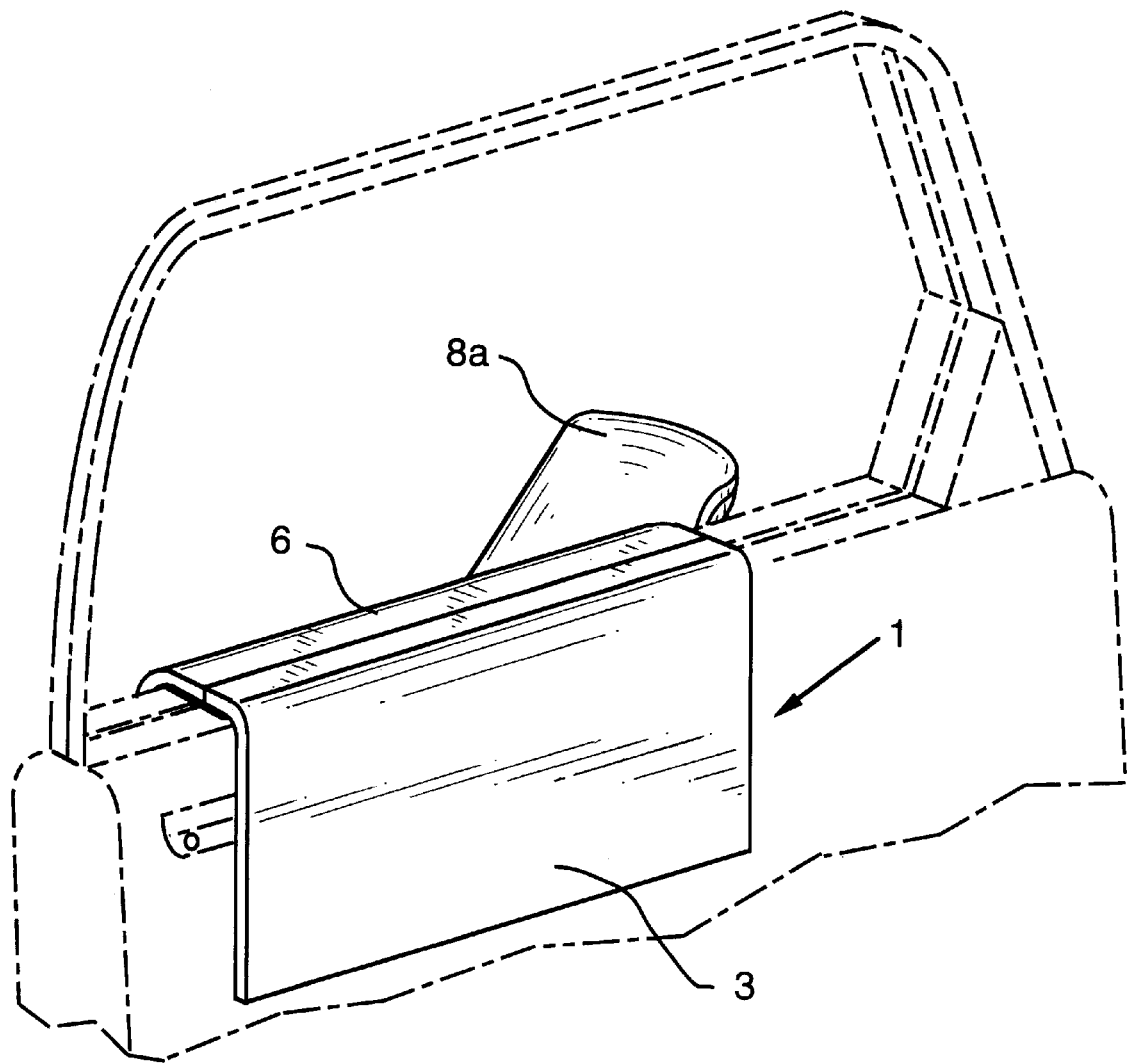
FIG. 3 is a perspective view of the invention in use from the outside of a car.

FIG. 2 shows the support base (4) inserted into car door from the inside of vehicle, while FIG. 3 shows the car door protective device (1) inserted into car door from the inside of the vehicle door.

I claim:

1. A portable pet car pad (A) for protecting a car door comprising an outer window insert (2) which is insertable adjacent to an outer side of an open window on a vehicle door for protecting the car door from pet paws, wherein said insert (2) is connected to a downwardly projecting, bendable car door protective shield (3); and a support base (4) including an inner window insert (5) which is in abutting relationship with the outer window insert (2) and is insertable adjacent to an inner side of the window on the vehicle door to support pet paws, a window support base (6) connected to said inner window insert (5) for resting on a base of the open window, a downwardly projecting inner car door support arm (7) connected to said window support base (6), and a paw support step (8) laterally extending from the lowermost portion of said support arm (7).

2. A portable pet car pad (A) as in claim 1 wherein said step (8) comprises a forwardly positioned upwardly sloping arm (8A) to restrain pet during vehicle motion.

* * * * *